Figure 1:
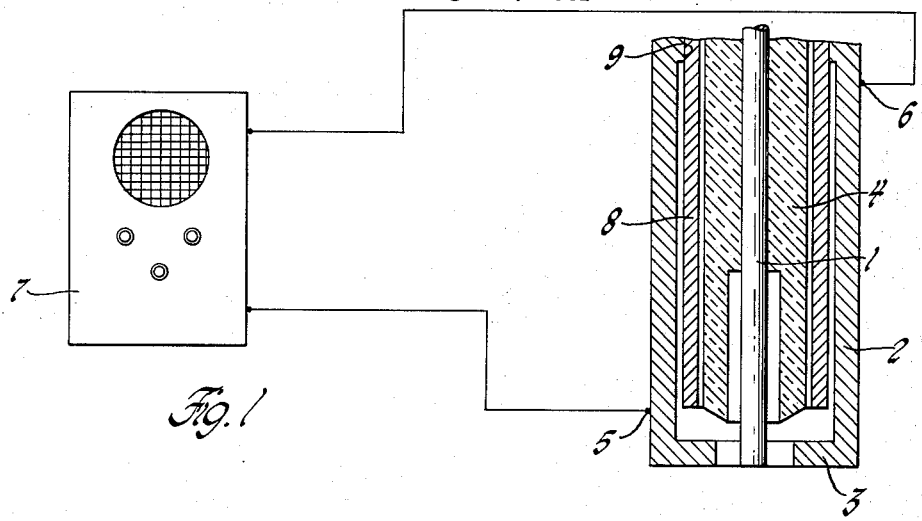

March 1, 1966   W. A. BYCHINSKY   3,238,447
IGNITER PLUG WITH SPARK-SENSING MEANS
Filed Aug. 15, 1961

INVENTOR.
Wilfred A. Bychinsky
BY
Paul J. Reising
ATTORNEY

United States Patent Office 3,238,447
Patented Mar. 1, 1966

3,238,447
IGNITER PLUG WITH SPARK-SENSING MEANS
Wilfred A. Bychinsky, Flint, Mich., assignor to General Motors Corporation, Detroit, Mich., a corporation of Delaware
Filed Aug. 15, 1961, Ser. No. 131,683
5 Claims. (Cl. 324—15)

This invention relates to an igniter plug useful for rocket and jet engines and having improved means to detect and indicate the occurrence of arcing across the igniter spark gap.

It is desirable that igniters, and particularly igniters for rocket propelled missiles, be equipped with means whereby it can be known whether the igniter is operative prior to admission of the fuel to the rocket engine's combustion chamber and also during flight of the missile. In copending application Serial No. 131,678 filed August 15, 1961, in the name of William J. Johnston and assigned to the assignee of the present invention, there is disclosed and claimed an igniter plug with spark-sensing means which utilizes the inherent electrical resistance of one of the igniter electrodes to indicate current flow in said electrode and, hence, to indicate the occurrence of sparking. In the preferred embodiment of the igniter covered, the ground electrode is in the form of a metal sleeve which surrounds the center electrode, there being an electrical insulator therebetween. A pair of electrical leads are secured in contact with the ground electrode sleeve at axially spaced points thereon, the lower contact point being adjacent the spark gap. These electrical leads extend to suitable instrumentation to indicate any voltage drop across the two contact points; if the igniter is inoperative there is no current flow through the ground electrode and hence no voltage drop across the two points but if the igniter is operative then the electrical resistance of the electrode material between the two points causes a voltage drop which is indicated by the instrumentation. The problem with the system as thus far described and as covered by the aforesaid patent application is that if there occurs any electrical puncture within the igniter between the electrodes, there can be current flow in the ground electrode between the two contact points despite the fact that the igniter is inoperative to produce arcing at the spark gap. Such electrical puncture might, for example, occur by reason of a crack in the insulation within the igniter between the center and ground electrodes.

It is an object of the present invention to provide a solution to the aforesaid problem, i.e., to provide an improvement in the igniter covered by the aforesaid patent application which assures that any electrical puncture that might take place in the igniter other than at the spark gap is rendered ineffective to produce a false indication of igniter operativeness. Briefly, this object is accomplished in accordance with the invention by interposing between the two electrodes a metal grounding member, the portion of the grounding member which is adjacent that portion of the ground electrode between the two contact points being spaced from the ground electrode. Hence, the grounding member intercepts any current flow between the electrodes that might result from electrical breakdown of the insulator within the igniter thereby precluding current flow in that portion of the ground electrode between the contact points except when the igniter is operative to produce arcing at the spark gap.

Figure 2:
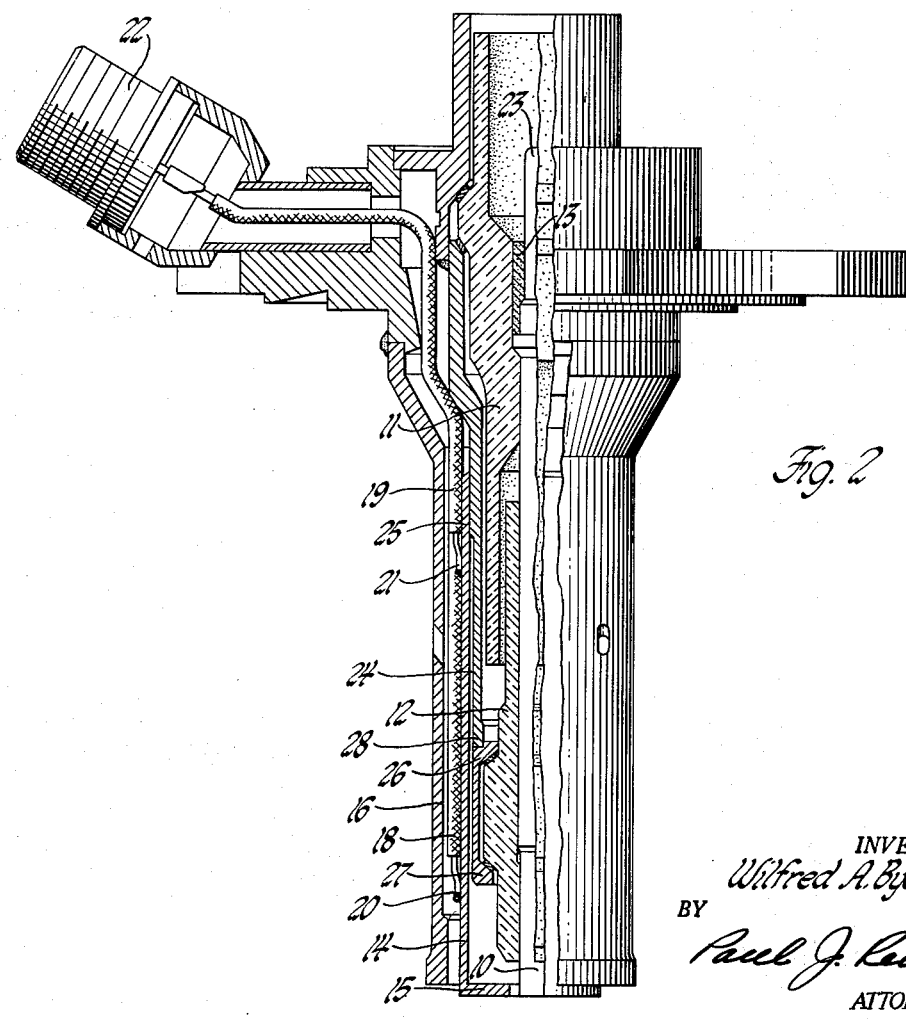

This and other objects, advantages and features of the invention will appear more clearly from the following detailed description thereof made with reference to the drawings in which:

FIGURE 1 is a sectional view of a simplified embodiment of the invention with the circuitry and instrumentation shown schematically; and FIGURE 2 shows a preferred embodiment with parts broken away and in partial section.

Referring now to FIGURE 1, the igniter plug shown comprises a metal center electrode 1 extending axially through a metal shell 2 which serves as the ground electrode, the lower end of the center electrode being in spaced relation with an in-turned flange 3 at the bottom of the shell to form a spark gap therewith. A conventional ceramic insulator 4 surrounding the center electrode serves to electrically separate the center electrode from the shell or ground electrode. There is an electrical connection to the shell at the lower end thereof adjacent the spark gap, as shown at 5, and a second electrical connection up higher on the shell, at a point spaced axially from the first connection, as shown at 6. The wires leading from the two electrical connections extend to suitable instrumentation 7 for indicating any voltage drop across points 5 and 6 on the shell when current is flowing through the shell. The device as thus far described is covered by the aforesaid patent application and operates as follows: If the igniter is inoperative such that no arcing occurs across the spark gap, there is no current flow through the shell and hence no indication by the instrumentation of a drop in potential between points 5 and 6. But if the igniter is operative to provide arcing across the spark gap, then there is a current flow through the shell and the inherent electrical resistance of the shell material provides a voltage drop across points 5 and 6 which drop will be read by the instrumentation to thereby indicate the operativeness of the igniter. In accordance with the present invention, a metal sleeve 8 surrounds the insulator 4 to adjacent the spark gap, this sleeve being spaced from that portion of the ground electrode 2 which is between the contact points 5 and 6 and being in electrical contact with the ground electrode at 9, just above the upper contact point 6. It will be seen that if, because of insulator failure, there is any arcing or electrical leakage in the portion of the igniter between the contact points 5 and 6, the current, instead of flowing to and through the lower ground electrode section which is between the contact points, will be intercepted by sleeve 8 and conducted to the grounding shell at point 9. Hence, current flow and resulting voltage drop between points 5 and 6 on the ground electrode are precluded in the event of insulator failure and can only occur if the igniter is operative to produce arcing in the spark gap thereby assuring that the detection of a voltage drop across points 5 and 6 is absolute indication of igniter operativeness.

FIGURE 2 shows a much refined embodiment of the invention which includes a center electrode 10 surrounded by two telescoping ceramic insulators 11 and 12 and secured in the upper insulator 11 by a body of fused glass 13. The ground electrode is in the form of a metal sleeve 14 having an inwardly extending flange 15 at the lower end thereof extending into spaced relation with the lower end of the center electrode to form a spark gap therewith. The metal shell assembly includes, in addition to the ground electrode 14, an outer cylindrical metal sleeve 16 which serves as a passageway for the admission of gas, its only function specifically as regards the present invention being that it serves as shielding to prevent induced currents in the electrical leads hereafter described.

A pair of electrical leads 18 and 19 each with a covering of heat-resistant insulating material extend downwardly through the shell between sleeve 16 and ground electrode sleeve 14, wire 18 being bonded in an electrical contact with ground electrode sleeve 14 toward the lower end thereof at point 20, and wire 19 being bonded in electrical contact with sleeve 14 toward the upper end thereof at point 21. A suitable electrical connector for making contact between the wires 18 and 19 and the instrumentation is located at the top of the shell as shown at 22.

For optimum heat resistance it is desirable that each of the electrical leads 18 and 19 comprise a wire having as its insulation packed magnesium oxide swaged within a metal tube which concentrically surrounds the wire. With such a lead, the metal tube serves as adequate electrical shielding to prevent induced currents thereby dispensing with the need for outer sleeve 16 as regards its aforementioned shielding function.

The electrical connections for the igniter are provided by the top of the center electrode as shown at 23 and by the shell itself.

In accordance with the invention, a metal sleeve 24 is interposed between the ground electrode sleeve 14 and the insulators, and is shaped so as to be spaced from that portion of the sleeve 14 which is between the contact points 20 and 21. The upper end of sleeve 24 is bonded in electrical contact with ground at point 25, adjacent upper contact point 21, and the lower end is formed with a pair of annular flanges 26 and 27 which serve to secure insulator 12 within the assembly as shown. For simplicity of manufacture the lower end of sleeve 24 is formed as a separate piece which is welded to the upper part of the sleeve as shown at 28.

It will be seen that if by reason of a cracked insulator, arcing occurs within the igniter rather than at the spark gap, the current flow for the arcing circuit will occur not through the ground electrode sleeve but through the inner sleeve 24, and since the sleeve 24 forms no part of the spark monitoring circuit such current flow will be ineffective to indicate proper functioning of the actually malfunctioning igniter. Hence, indication by the instrumentation of a voltage drop and therefore current flow across points 20 and 21 is assurance that arcing is occurring at the firing end of the igniter, i.e., at the spark gap.

It will be understood that while the invention has been described with reference to particular embodiments thereof, various changes and modifications may be made, all within the full and intended scope of the claims which follow.

I claim:

1. In an igniter plug having a pair of electrodes with portions in spaced relationship to provide a spark gap therebetween and means connected to one of said electrodes to indicate a voltage drop across two points thereon when said igniter operates to produce a spark in said gap, the improvement which comprises an electrically conducting member interposed between said electrodes and electrically connected to said one of said electrodes to prevent any current flow in said one electrode between said two points other than current flow which occurs by reason of sparking in said gap.

2. In an igniter plug comprising a center electrode and a ground electrode separated from each other by an electrical insulator, said electrodes having end portions in spaced relationship to provide a spark gap therebetween and means connected to said ground electrode to indicate a voltage drop across two points thereon when said igniter operates to produce a spark in said gap, the improvement which comprises an electrically conducting member interposed between said electrodes and electrically connected to said ground electrode to prevent any current flow in said ground electrode between said two points other than current flow which occurs by reason of sparking in said gap.

3. An igniter plug having a pair of elongate electrodes with lower end portions in spaced relationship to provide a spark gap therebetween, means for indicating whether arcing is occurring in said gap, said means including a pair of electrical conductors connected to one of said electrodes at upper and lower spaced points thereon to indicate any voltage drop across said spaced points, and an electrically conducting member interposed between said electrodes, said member being spaced from that portion of said one electrode which is between said spaced points and being electrically connected to said one electrode at a point above said upper spaced point whereby said member prevents any current flow to said one electrode other than current flow which occurs by reason of sparking in said gap.

4. An igniter plug having an elongate center electrode surrounded by a generally tubular shaped ground electrode, the lower end portions of said electrodes being in spaced relationship to provide a spark gap therebetween, means for indicating whether arcing is occurring in said gap, said means including a pair of electrical conductors connected to said tubular shaped ground electrode at upper and lower spaced points thereon to indicate any voltage drop across said spaced points and a metal sleeve interposed between said electrodes, said sleeve being spaced from that portion of the ground electrode which is between said spaced points and being electrically connected to said ground electrode at a point above the upper of said spaced points whereby said sleeve prevents any current flow to said ground electrode other than current flow which occurs by reason of sparking in said gap.

5. An igniter plug comprising an elongate center electrode extending concentrically through a generally tubular shaped ground electrode and separated therefrom by upper and lower electrical insulators, said electrodes having lower end portions in spaced relationship to provide a spark gap therebetween, a pair of electrical conductors connected to said ground electrode at upper and lower spaced points thereon to indicate any voltage drop across said spaced points and a metal sleeve interposed between said electrodes and serving to support said lower electrical insulator, said sleeve being spaced from that portion of the ground electrode which is between said spaced points and being electrically connected to said ground electrode at a point above the upper of said spaced points whereby said sleeve prevents any current flow to said ground electrode other than current flow which occurs by reason of sparking in said gap.

References Cited by the Examiner

UNITED STATES PATENTS

| | | | |
|---|---|---|---|
| 1,395,570 | 11/1921 | Holland | 324—17 |
| 1,536,808 | 5/1925 | Norden | 324—17 |

WALTER L. CARLSON, *Primary Examiner.*